US009690610B2

(12) United States Patent
Katsura et al.

(10) Patent No.: US 9,690,610 B2
(45) Date of Patent: Jun. 27, 2017

(54) COMPUTER SYSTEM AND MANAGEMENT COMPUTER CONTROLLING METHOD

(71) Applicant: HITACHI, LTD., Tokyo (JP)

(72) Inventors: Naohiro Katsura, Tokyo (JP); Yuta Eno, Tokyo (JP); Takashi Chikusa, Yokohama (JP)

(73) Assignee: HITACHI, LTD., Tokyo (JP)

(*) Notice: Subject to any disclaimer, the term of this patent is extended or adjusted under 35 U.S.C. 154(b) by 180 days.

(21) Appl. No.: 14/425,643

(22) PCT Filed: Jul. 29, 2014

(86) PCT No.: PCT/JP2014/069946
§ 371 (c)(1),
(2) Date: Mar. 4, 2015

(87) PCT Pub. No.: WO2016/016949
PCT Pub. Date: Feb. 4, 2016

(65) Prior Publication Data
US 2016/0246625 A1    Aug. 25, 2016

(51) Int. Cl.
*G06F 9/455* (2006.01)
*G06F 9/46* (2006.01)
*G06F 9/50* (2006.01)

(52) U.S. Cl.
CPC ............ *G06F 9/45558* (2013.01); *G06F 9/46* (2013.01); *G06F 9/50* (2013.01); *G06F 9/5077* (2013.01); *G06F 2009/4557* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS 5,898,870 A * 4/1999 Okuda .................... G06F 9/505
718/104
2010/0250746 A1   9/2010 Murase
2014/0380303 A1* 12/2014 Bello ................. G06F 9/45558
718/1

FOREIGN PATENT DOCUMENTS

JP         09167141 A    6/1997
WO      2012077390 A1    6/2012

* cited by examiner

*Primary Examiner* — Kenneth Tang
(74) *Attorney, Agent, or Firm* — Volpe and Koenig, P.C.

(57) ABSTRACT

In a computer system having a plurality of integrated systems of servers and storage apparatuses and having a management computer, each of the plurality of integrated systems has a plurality of resources having different ratios, and the management computer, depending on the ratios of the plurality of resources required for a work, selects an integrated system in which the work is executed from the plurality of integrated systems.

11 Claims, 14 Drawing Sheets

F I G. 2
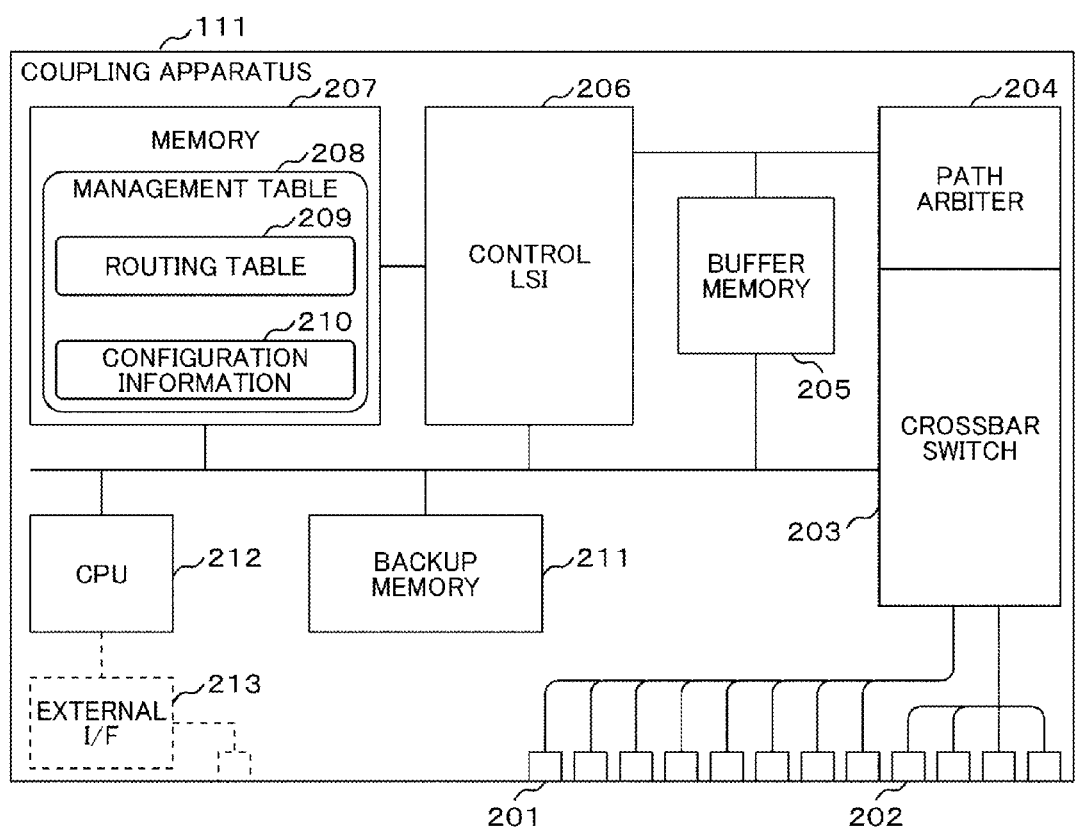

F I G. 5
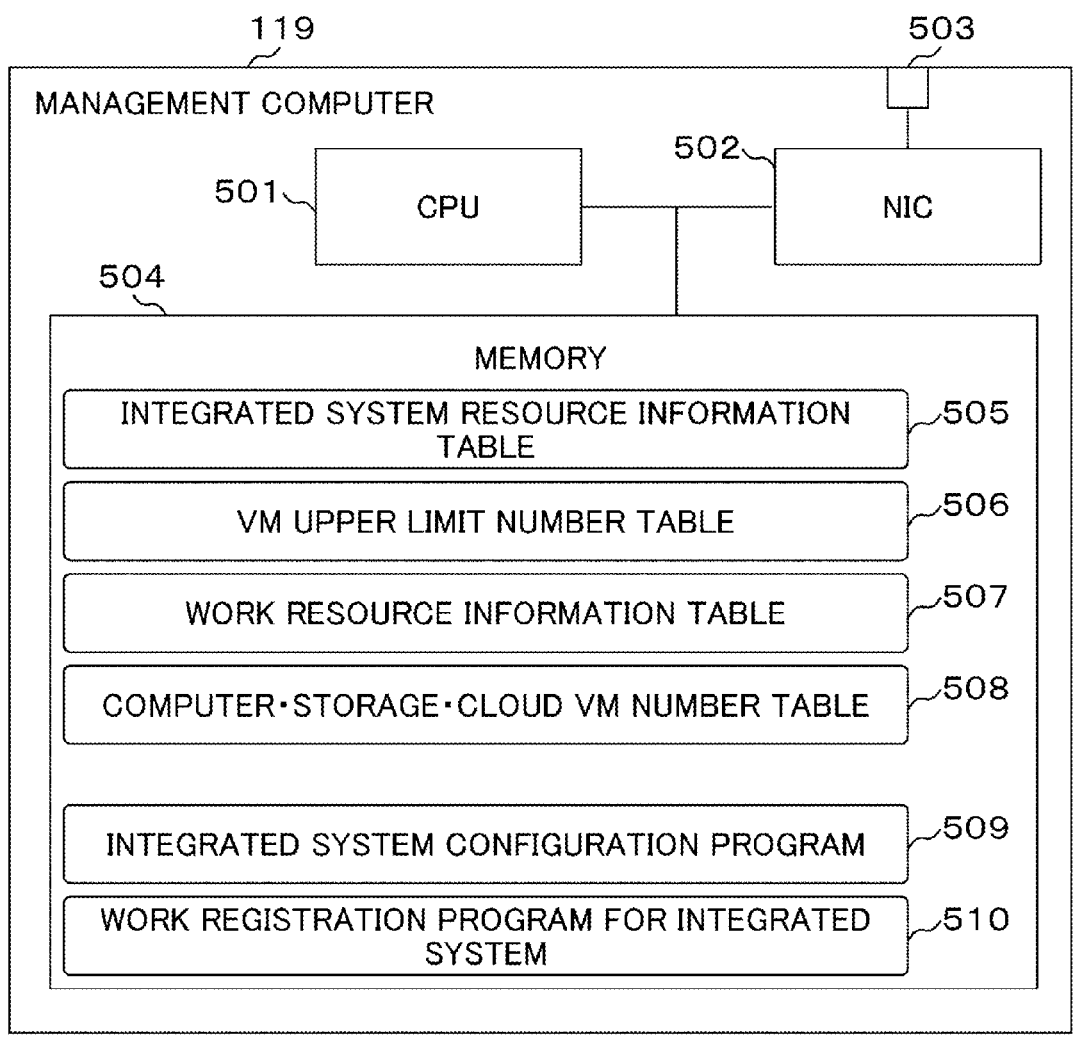

F I G. 8

| Sys-ID | INTEGRATED SYSTEM NAME | Sys-Type | STORAGE MODEL | SERVER MODEL | NUMBER OF SERVERS | COMPUTER VM | STORAGE VM | CLOUD COOPERATION VM |
|---|---|---|---|---|---|---|---|---|
| A01 | SYSTEM-TYPE-A_01 | A | STR-P | SRV-X | 20 | 40% | 40% | 20% |
| A02 | SYSTEM-TYPE-A_01 | A | STR-P | SRV-Y | 15 | 40% | 40% | 20% |
| B01 | SYSTEM-TYPE-B_01 | B | STR-Q | SRV-Y | 25 | 25% | 60% | 15% |
| C01 | SYSTEM-TYPE-C_01 | C | STR-R | SRV-X | 10 | 80% | 5% | 15% |
| S01 | SYSTEM-SPECIAL01 | CUSTOM | STR-Q | SRV-X | 30 | 50% | 0% | 50% |

| Sys-ID | SERVER TYPE | NUMBER OF SERVERS | COMPUTER VM UPPER LIMIT | STORAGE VM UPPER LIMIT | CLOUD COOPERATION VM UPPER LIMIT |
|---|---|---|---|---|---|
| A01 | STANDARD | 20 | 160 | 160 | 80 |
| A02 | STANDARD | 15 | 120 | 120 | 60 |
| B01 | STANDARD | 25 | 125 | 300 | 75 |
| C01 | STANDARD | 10 | 160 | 10 | 30 |
| S01 | STANDARD | 30 | 300 | 0 | 300 |

| WORK NAME | CLOUD MIGRATABLE FLAG | CONSUMPTION COMPUTER VM | | | CONSUMPTION STORAGE VM | | | STORAGE | |
|---|---|---|---|---|---|---|---|---|---|
| | | TOTAL SUM | HIGH PERFORMANCE (VM×3) | STANDARD (VM×1) | TOTAL SUM | HIGH PERFORMANCE (VM×VOLs) | STANDARD (VM×1) | NUMBER OF VIRTUAL VOLs | VIRTUAL VOL CAPACITY |
| J | N | 26 (84%) | 2 | 20 | 5 (16%) | 1 | 0 | 5 | 200GB |
| K | Y (COM) | 15 (50%) | 0 | 15 | 15 (50%) | 1 | 0 | 15 | 600GB |
| L | Y (ALL) | 13 (93%) | 1 | 10 | 1 (7%) | 0 | 1 | 1 | 40GB |
| ... | ... | ... | ... | ... | ... | ... | ... | ... | ... |

FIG. 12

| Sys-ID | INTEGRATED SYSTEM NAME | Sys-Type | COMPUTER VM THRESHOLD VALUE | COMPUTER VM NUMBER OF CONSUMED VMs | STORAGE VM THRESHOLD VALUE | STORAGE VM NUMBER OF CONSUMED VMs | CLOUD COOPERATION VM THRESHOLD VALUE | CLOUD COOPERATION VM NUMBER OF CONSUMED VMs |
|---|---|---|---|---|---|---|---|---|
| A01 | SYSTEM-TYPE-A_01 | A | 160 | 70 | 160 | 60 | 80 | 40 |
| A02 | SYSTEM-TYPE-A_01 | A | 120 | 45 | 120 | 55 | 60 | 20 |
| B01 | SYSTEM-TYPE-B_01 | B | 125 | 40 | 300 | 85 | 75 | 35 |
| C01 | SYSTEM-TYPE-C_01 | C | 160 | 26 | 10 | 5 | 30 | 5 |
| S01 | SYSTEM-SPECIAL01 | CUSTOM | 300 | 50 | 0 | 0 | 300 | 55 |

508

COMPUTER SYSTEM AND MANAGEMENT COMPUTER CONTROLLING METHOD

TECHNICAL FIELD

The present invention relates to a computer system and a management computer controlling method.

BACKGROUND ART

In recent years, an integrated system (also generally called a converged system) in which a computer and a plurality of apparatuses such as storage apparatuses are built in advance by a vender that provides systems begins to be used. The use of the integrated system frees a user from a trouble of building a system. On the other hand, since it is difficult that a vender predicts in advance all loads changing with time on a system, resources are also redistributed. For example, PTL 1 discloses a technique in which a system having a plurality of servers and a plurality of storages is coupled to a cloud service, resources in the servers and the storages of the system are periodically monitored, and resources are redistributed between the cloud service and the system in case of shortage of the system resources.

CITATION LIST

Patent Literature

PTL1: U.S. Patent Application Publication No. 2010/0250746

SUMMARY OF INVENTION

Technical Problem

In use of the technique disclosed in PTL 1, even though works and applications in a server are changed to change loads, the works can be processed by redistributing resources. However, since large-scale redistribution causes large overhead, the configuration of the first system architecture is still important. Even though redistribution is not large-scale, small-scale redistribution can reduce a load caused by the redistribution.

Thus, it is an object of the present invention to provide a computer system can cope with various works requiring different resources and reduce redistribution of resources.

Solution to Problems

A typical computer system according to the present invention is a computer system that has a plurality of integrated systems including servers and storage apparatuses and has a management computer, wherein each of the plurality of integrated systems has a plurality of resources the ratios of which are different from each other, and the management computer selects, depending on ratios of a plurality of resources required for a work, an integrated system in which the work is executed from the plurality of integrated systems.

The present invention is also recognized as a management computer controlling method.

Advantageous Effects of Invention

According to the present invention, a computer system that can cope with various works requiring different resources can be provided and makes it possible to reduce redistribution of the resources.

BRIEF DESCRIPTION OF DRAWINGS

FIG. 2 is a diagram showing an example of the configuration of a coupling apparatus.

FIG. 5 is a diagram showing an example of the configuration of a management computer.

FIG. 8 is a diagram showing an example of an integrated system resource information table.

FIG. 10 is a diagram showing an example of a VM upper limit number table.

FIG. 11 is a diagram showing an example of a work resource information table.

FIG. 12 is a diagram showing an example of a compute•storage•cloud VM number table.

DESCRIPTION OF EMBODIMENTS

A preferred embodiment of the present invention will be described below with reference to the accompanying drawings. In the following description, although various pieces of information are explained as expressions "* tables", the various pieces of information may be expressed as data structures except for tables. In order to show that the pieces of information do not depend on data structures, a "* table" can be called "*** information".

In the following description, although a process may be explained by using a "CPU" as a subject, the CPU may be a controller including a processor or a CPU. The CPU executes a program performs a predetermined process while arbitrarily using memory resources (for example, memory chips) and/or a communication interface device (for example, a communication port). A process explained by using a CPU as a subject may be a process performed by a management system (for example, a management computer or a server) having the CPU. The CPU may not only execute a program but also include a hardware circuit that executes some processes or all processes executed by the CPU.

The program may be installed in a computer with a program distribution server or a computer readable memory medium. In this case, the program distribution server includes a CPU and a memory resource, and the memory resource further stores a distribution program and a program to be distributed. The distribution program is executed to cause the CPU of the program distribution server to distribute the program to be distributed to another computer.

The management computer has input/output devices. As examples of the input/output devices, a display, a keyboard, and a pointer device are conceived. However, other devices may be used. As alternatives of the input/output devices, a serial interface or a network interface is used as an input/output device, and a display computer having a display, a keyboard, or a pointer device is coupled to the interface. Display information is transmitted to the display computer, or input information is received from the display computer to perform display on the display computer and to accept an input through the display computer so as to alternatively perform an input operation and a display operation normally performed in the input device.

A set of at least one computer that manages a computer system and manages and controls a storage system may be called as a management system. When the management computer displays display information, the management computer is a management system. A combination of the management computer and the display computer is also a management system. Processes that are equivalent to those of the management computer may be achieved by a plurality of computers to obtain a high-speed high-reliable management process. In this case, the plurality of computers (also including a display computer when the display computer performs display) configures the management system.

EXAMPLE 1

Figure 1:
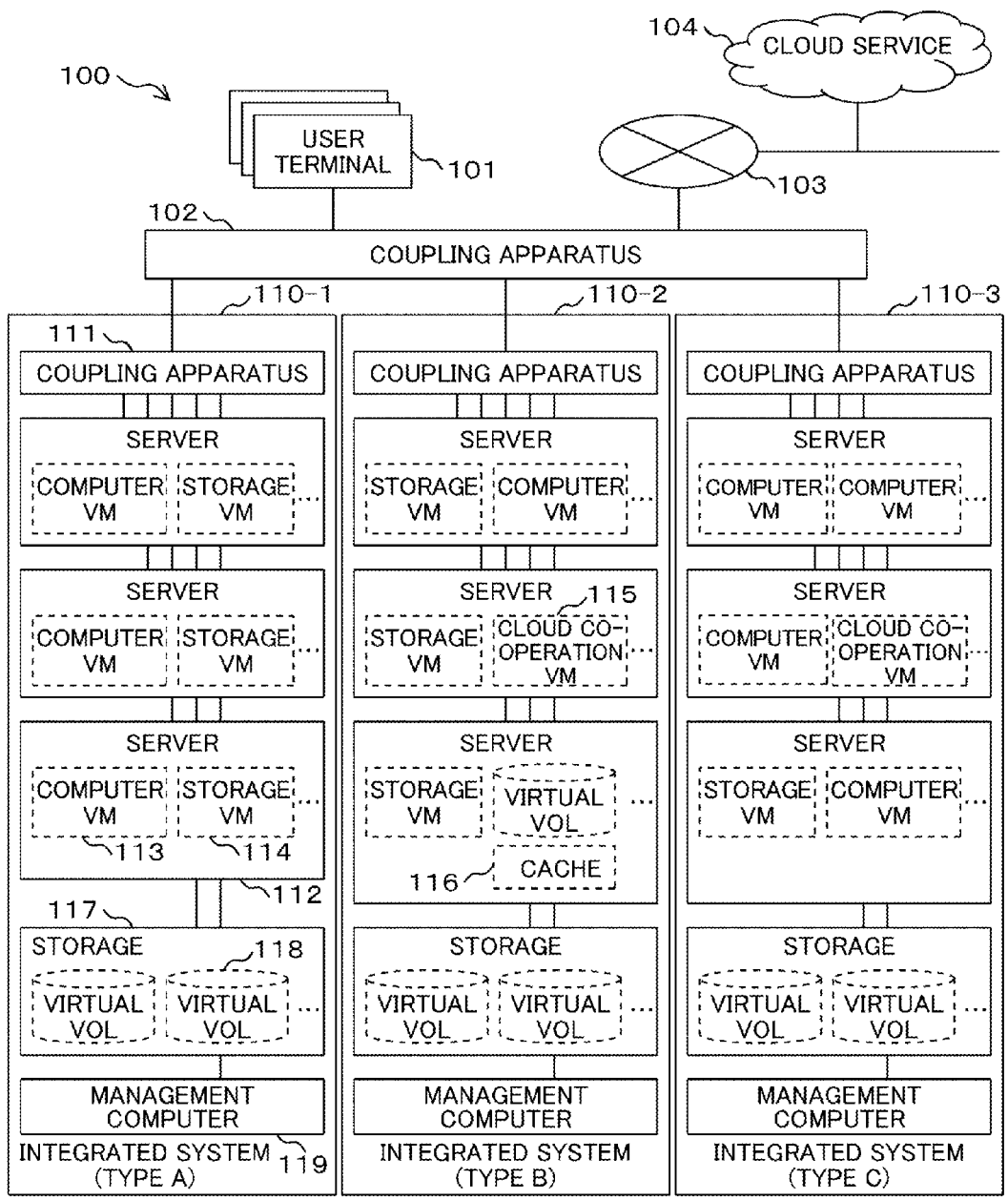
FIG. 1 is a diagram showing an example of the configuration of a computer system.

FIG. 1 is a diagram showing an example of the configuration of a computer system 100. A coupling apparatus 102 couples a network 103 including at least one user terminal 101 and a cloud service 104 to at least one of integrated systems 110-1, 110-2, and 110-3. In the following description, when the integrated systems 110-1, 110-2, and 110-3 need not be discriminated from each other, the integrated systems 110-1, 110-2, and 110-3 are called as an integrated system 110. The user terminal 101 is a terminal that inputs and outputs work processing executed by the integrated system 110. The cloud service 104 is a service that is in charge of a part of the work processing executed by the integrated system 110.

The computer system 100 includes integrated systems 110 of three types depending on work contents. For example, an integrated system 110-1 of type A is used for mails, Web browsing, creation of documentation, and the like. A computer resource and a storage resource are standardly distributed to the integrated system 110-1. An integrated system 110-2 of type B is used for video distribution and large-capacity storage. A storage resource is selectively distributed to the integrated system 110-2. An integrated system 110-3 of type C is used for big data analysis and large-scale simulation. A computer resource is selectively distributed to the integrated system 110-3. When new work processing is required, the work processing is automatically allocated to the integrated system 110 of a type suitable for the contents of the work.

In this manner, a state in which, although the computer resource is short in one of the integrated systems 110, the storage resource is excessive does not easily occur, the necessity of redistribution of the resources decreases, and the resources are efficiently utilized in the whole computer system 110. Furthermore, since the necessity of estimating work processing which is added or deleted with an operating time of the computer system 100 when the configuration of the computer system 100 is designed decreases, a period of time until the computer system 100 is structured is shortened. Furthermore, computer systems are not separately structured in units of sections that execute specific works in one company, and the computer system 100 can be integrally structured in one company including various work contents.

Although FIG. 1 shows the three types as an example, the number of times is not limited to three. The computer system 100 may include the integrated systems 110 of three or more types or may include the plurality of integrated systems 110 of the same type. The contents of the types are not limited to those in the above description, and the computer system 100 may include an integrated system of a type except for types A to C.

The configuration of the integrated system 110 will be described below with reference to FIG. 1. The coupling apparatus 111 in the integrated system is coupled to the coupling apparatus 102 arranged outside the integrated system 110, and couples at least one server 112, at least one storage 117, and a management computer 119. Although the configurations of the apparatuses will be described later with reference to FIGS. 2 to 5, the server 112 is a physical computer, and one server 112 can execute a plurality of VM (Virtual Machines). The VMs include, for example, a computer VM 113, a storage VM 114, and a cloud cooperation VM 115.

The computer VM 113 is a commonly used VM. A commonly used OS (Operating System) is installed in the computer VM 113 to execute an application program or the like. The storage VM 114 is a VM operating as a storage controller. The storage VM 114 provides the storage 117 in the integrated system 110 to the computer VM 113 as a virtual VOL (Volume) or a cache, or provides the storage 117 to the user terminal 101 as an externally coupled virtual VOL. The storage VM 114 may control a remote copy operation or the like included in the storage 117 or processes a remote copy operation or the like with another integrated system 110 or the cloud service 104.

The cloud cooperation VM 115 is to cooperate with the cloud service 104. When a process in the computer VM 113 or the storage VM 114 in the server 112 is moved to the could service 104, the cloud cooperation VM 115 makes the moved process in the computer VM 113 or the storage VM 114 look as if the process is executed in the server 112. The cloud cooperation VM 115 may integrate the physical resources of the integrated system 110 and the resources of the cloud service 104 with each other. More specifically, the server 112 does not have the storage VM 114, and the cloud cooperation VM 115 may make the storage of the cloud service 104 look as if the storage is held in the server 112 as the storage VM 114. The integrated system 110 may have the storage VM 114 but not have the physical resource of the storage 117, the cloud cooperation VM 115 may make the storage of the cloud service 104 look as if the physical resource of the storage 117 is held in the integrated system 110, and the storage made look like the physical resource of the storage 117 may be used by the storage VM 114. Furthermore, the cloud cooperation VMs 115 may be independently used depending on applications, one of the cloud cooperation VMs 115 may collectively perform processes for a plurality of purposes.

The types of the VMs are not limited to those in the above description, and the server 112 may execute VMs of other types. The type of the integrated system 110 is determined on the basis of the types and the number of VMs executed by one server. For example, the integrated system 110-1 of type A has the computer VMs 113 and the storage VMs 114, the numbers of which are equal to each other, the integrated system 110-2 of type B has the storage VMs 114, the number of which is larger than that of the computer VMs 113 and may have a cache 116, and the integrated system 110-3 of type C has the computer VMs 113, the number of which is larger than that of the storage VMs 114.

The storage 117 is a memory apparatus that makes a plurality of HDDs (Hard Disk Drives) or SSDs (Solid State Drives) look like a virtual VOL 118 as a whole and is read or written with the storage VM 114. The management computer 119 is a computer that manages the physical resources, the VMs, and the like held by the integrated system 110. The management computer 119 can communicate with another management computer 119 through the coupling apparatus 111 and the coupling apparatus 102.

FIG. 2 is a diagram showing an example of the configuration of the coupling apparatuses 111. The coupling apparatus 111 repeats a packet between a plurality of LAN (Local Area Network) ports 201 and between a plurality of FC (Fibre Channel) ports 202. For this purpose, the plurality of LAN ports 201 and the plurality of FC ports 202 are coupled to a crossbar switch 203, and the crossbar switch 203 couples the plurality of LAN ports 201 to each other, the plurality of FC ports 202 to each other, or the plurality of LAN ports 201 and the plurality of FC ports 202 to each other to repeat packets. A path arbiter 204 avoids collision occurring when a plurality of packets are repeated the same LAN port 201 or FC port 202 in the crossbar switch 203 by arbitration.

The buffer memory 205 is a buffer that temporarily stores a packet received through the LAN port 201 or the FC port 202. When the collision of packets cannot be avoided by only the control of coupling by the crossbar switch 203, the path arbiter 204 controls the buffer memory 205 to temporarily store the packets so as to shift repeating times, thereby avoiding the collision. The packets stored in the buffer memory 205 may be virtualized such that source addresses and destination addresses of the packets are converted, or may be converted into packets having a protocol different from the original packet.

A control LSI 206 controls the crossbar switch 203 according to a routing table 209 stored in the memory 207 to cause the crossbar switch 203 to select the LAN port 201 repeating packets and the FC port 202, thereby routing the packets. The control LSI 206 may control the path arbiter 204 to avoid packets from collide with each other and cause the path arbiter 204 to control the crossbar switch 203. The control LSI 206 may convert the packets stored in the buffer memory 205 to perform virtualization or the like.

The memory 207 is accessed by the control LSI 206 and the CPU 212. For example, a management table 208 is stored in the memory 207. The management table 208 includes a routing table 209 serving as information to repeat packets at the plurality of LAN ports 201 and the plurality of FC ports 202, and configuration information 210 serving as information related to the numbers of LAN ports 201 and FC ports 202 of the coupling apparatus 111 and the configurations of the integrated system 110, the user terminal 101, and the network 103 which are coupled to the coupling apparatus 111. The control LSI 206 may convert packets on the basis of the configuration information 210.

The CPU (Central Processing Unit) 212 controls the whole coupling apparatus 111. The CPU 212 operates according to a program (not shown) to configure the management table 208 and perform control which has not been performed by the control LSI 206. In order to load the management table 208 from the outside of the coupling apparatus 111, the coupling apparatus 111 may have an external I/F (Interface) 213. For example, the external I/F 213 may be coupled to a LAN dedicated to management, and the management table 208 may be received by the CPU 212 and written in the memory 207. A backup memory 211 is a nonvolatile memory to store the management table 208 therein when the memory 207 is a volatile memory.

Figure 3:
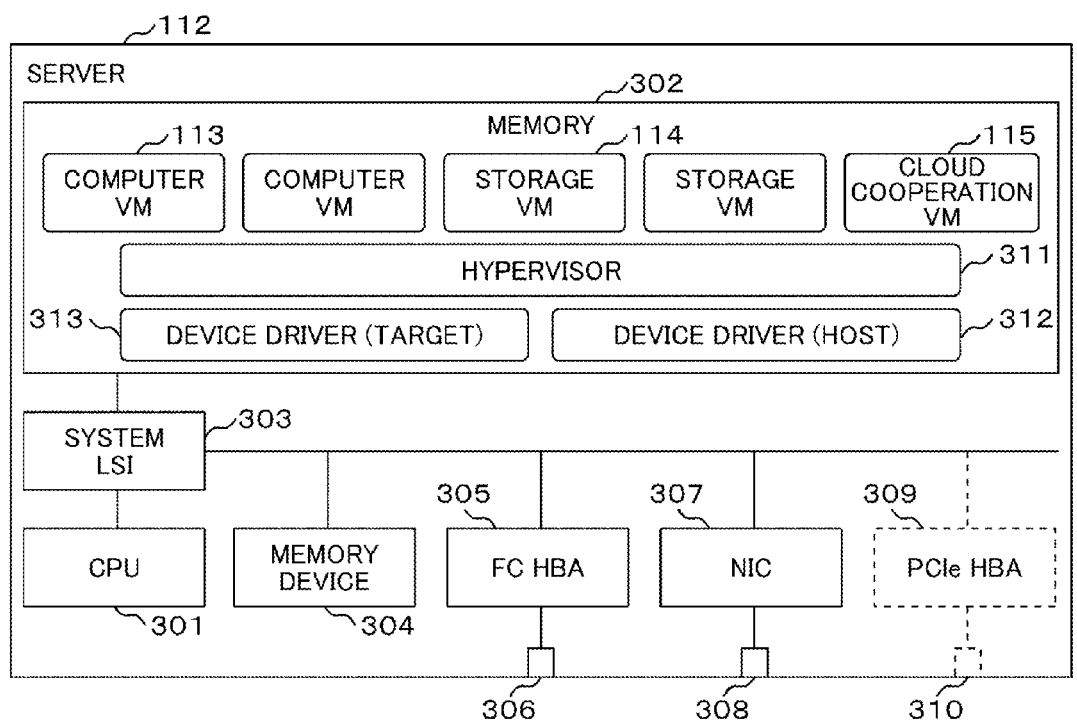
FIG. 3 is a diagram showing an example of the configuration of a server.

FIG. 3 is a diagram showing an example of the configuration of the server 112. A CPU 301 operates according to a program stored in a memory 302 to control an FC HBA 305, an NIC 307, and the like. The system LSI 303 is a so-called bus bridge to couple the CPU 301, the memory 302, and various devices to each other. A memory device 304 is an HDD, an SSD, or the like to store information which cannot be completely stored in the memory 302 therein, and to store a program or the like loaded from the memory device 304 to the memory 302 when the power supply of the server 112 is turned on.

The FC HBA (Fibre Channel Host Bus Adapter) 305 is a device to be coupled to the storage 117 by the FC port 306 through the coupling apparatus 111. The FC port 306 may be directly coupled to the storage 117. The NIC (Network Interface Card) 307 is a device to be coupled to the other server 112, the storage 117, and the coupling apparatus 102 by the LAN port 308 through the coupling apparatus 111. The LAN port 308 may be directly coupled to the other server 112 and the storage 117. The server 112 has a PCIe HBA (PCI express Host Bus Adapter) 309, and may be coupled to an external device by a PCIe port 310.

In the memory 302, programs and data for the computer VM 113, the storage VM 114, the cloud cooperation VM 115, a hypervisor 311, a device driver 313, and a device driver 314 are stored. Only part of the programs and the data may be stored, or all the programs and the data may be stored and partially used. The computer VM 113, the memory VM 114, and the cloud cooperation VM 115 have been described above. The hypervisor 311 has been popularly known and used in the field of virtualization technique to manage VMs. However, the hypervisor 311 is not limited to the above technique, and the hypervisor 311 is based on another virtualization technique.

The device driver 313 is to operate the server 112 as a target. For example, when the user terminal 101 accesses the server 112 to read data from the storage 117, the device driver 313 controls the NIC 307 to receive a packet to access from the user terminal 101 through the LAN port 308, and the server 112 makes the user terminal 101 look like a target device. The device driver 312 is to operate the server 112 as a host. For example, the storage VM 114 uses the device driver 312, and the device driver 312 controls the FC HBA 305 to transmit a packet from the FC port 306 to the storage 117.

The configuration of the server 112 is not limited to the configuration described above. The server 112 may have the plurality of CPUs 301, i.e., may have a so-called multiprocessor configuration. The server 112 may have the plurality of FC HBAs 305 and the plurality of NICs 307. The plurality of independent servers 112 may be simply coupled to each other to form the integrated system 110. The integrated system 110 may be a blade server, and the server 112 may be a blade. Furthermore, the plurality of servers 112 have the same configurations or different configurations, respectively, and the servers 112 have commonly-used computer configurations.

Figure 4:
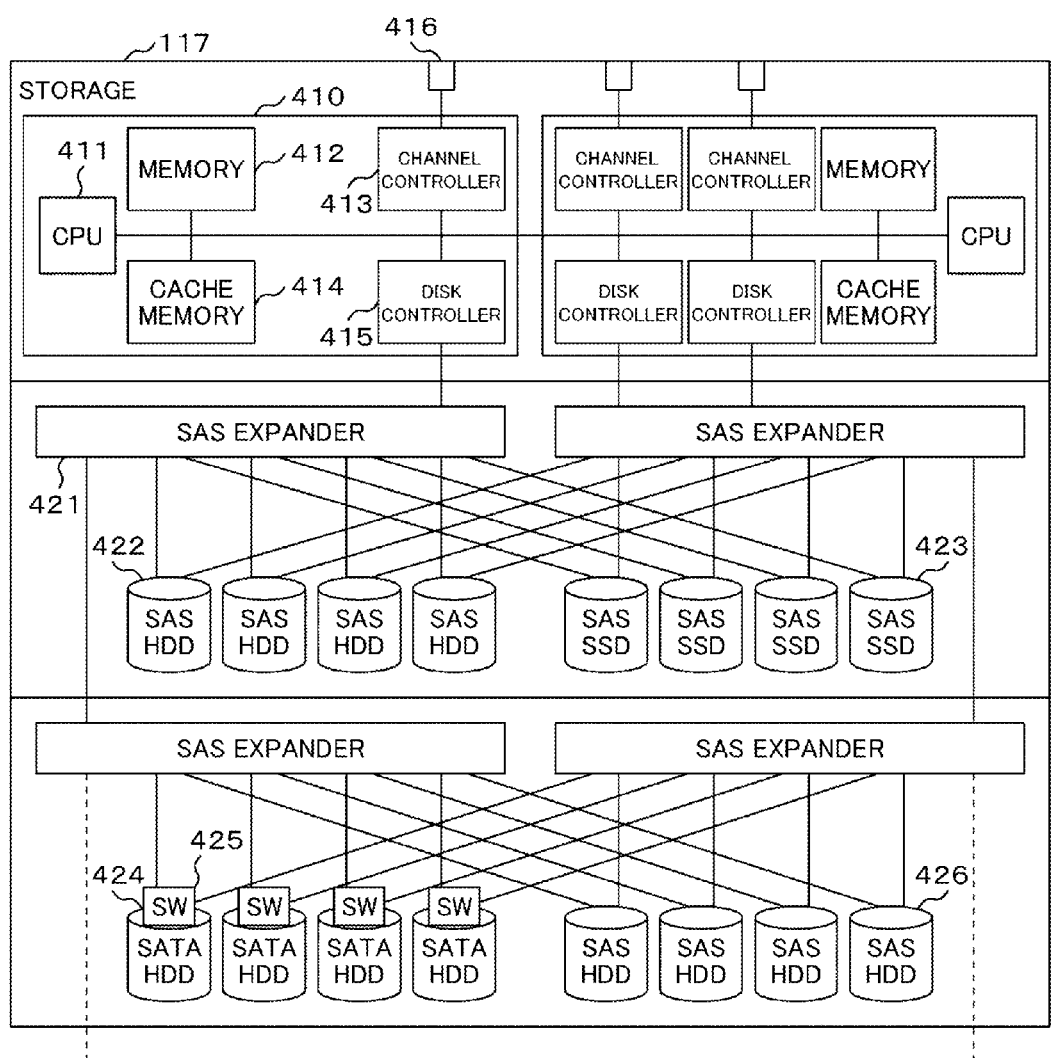
FIG. 4 is a diagram showing an example of the configuration of a storage.

FIG. 4 is a diagram showing an example of the configuration of the storage 117. A disk controller 410 accesses an HDD or an SSD depending on an access received by a port 416 to make the HDD or the SSD look like the virtual VOL 118. The CPU 411 controls a channel controller 413, a disk controller 415, and a cache memory 414 according to the program stored in the memory 412. In the memory 412, not only the program of the CPU 411 but also configuration information of the HDD or the SSD may be stored.

The channel controller 413 is to accept an access from the outside of the storage 117 through the port 416. Two or more ports 416 may be used, the ports 416 may be FC ports, LAN ports, and an FC port and a LAN port mixed with each other. In the cache memory 414, data read/written through the port 416 is temporarily stored.

The disk controller 415 is to be coupled to the HDD or the SSD by an SAS (Serial Attached SCSI). In the disk controller 410, the CPU 411 converts an access accepted by the port 416 and the channel controller 413 and outputs the converted access from the disk controller 415 to achieve the virtual VOL 118. Alternatively, the CPU 411 may control the channel controller 413 and the disk controller 415 to cause the channel controller 413 or the disk controller 415 to convert an access.

An SAS expander 421 is to couple the disk controller 410 to an SAS HDD 422, an SAS SSD 423, an SATA (Serial ATA) HDD 424, or an SAS HDD 426. The storage 117 may have the plurality of disk controllers 410, and the SAS expander 421 may be coupled such that the plurality of disk controllers 410 can access one of the SAS HDDs 422. The plurality of SAS expanders 421 is coupled in a cascade manner to make it possible to couple a larger number of HDDs or SSDs. An SW (Switch) 425 couples the SATA HDD 424 to the plurality of SAS expanders 421.

FIG. 5 is a diagram showing an example of the configuration of the management computer 119. A CPU 501 reads or writes data from a memory 504 according to a program stored in the memory 504, and controls an NIC 502 to communicate with the server 112, the storage 117, the other management computer 119, and the like through the LAN port 503. The memory 504 stores various tables and various programs therein, and the tables and the programs will be described later with reference to FIGS. 6 to 14. The management computer 119 is not limited to the configuration shown in FIG. 5, and may have a commonly-used computer configuration. One of the pluralities of management computers 119 shown in FIG. 1 may serve as a master computer to control the other management computers 119. The integrated systems 110 need not have the management computers 119, respectively, and a configuration or the like in which the computer system 100 has one management computer coupled to the coupling apparatus 102 may be used. The plurality of management computers 119 may configure a management system.

Figure 6:
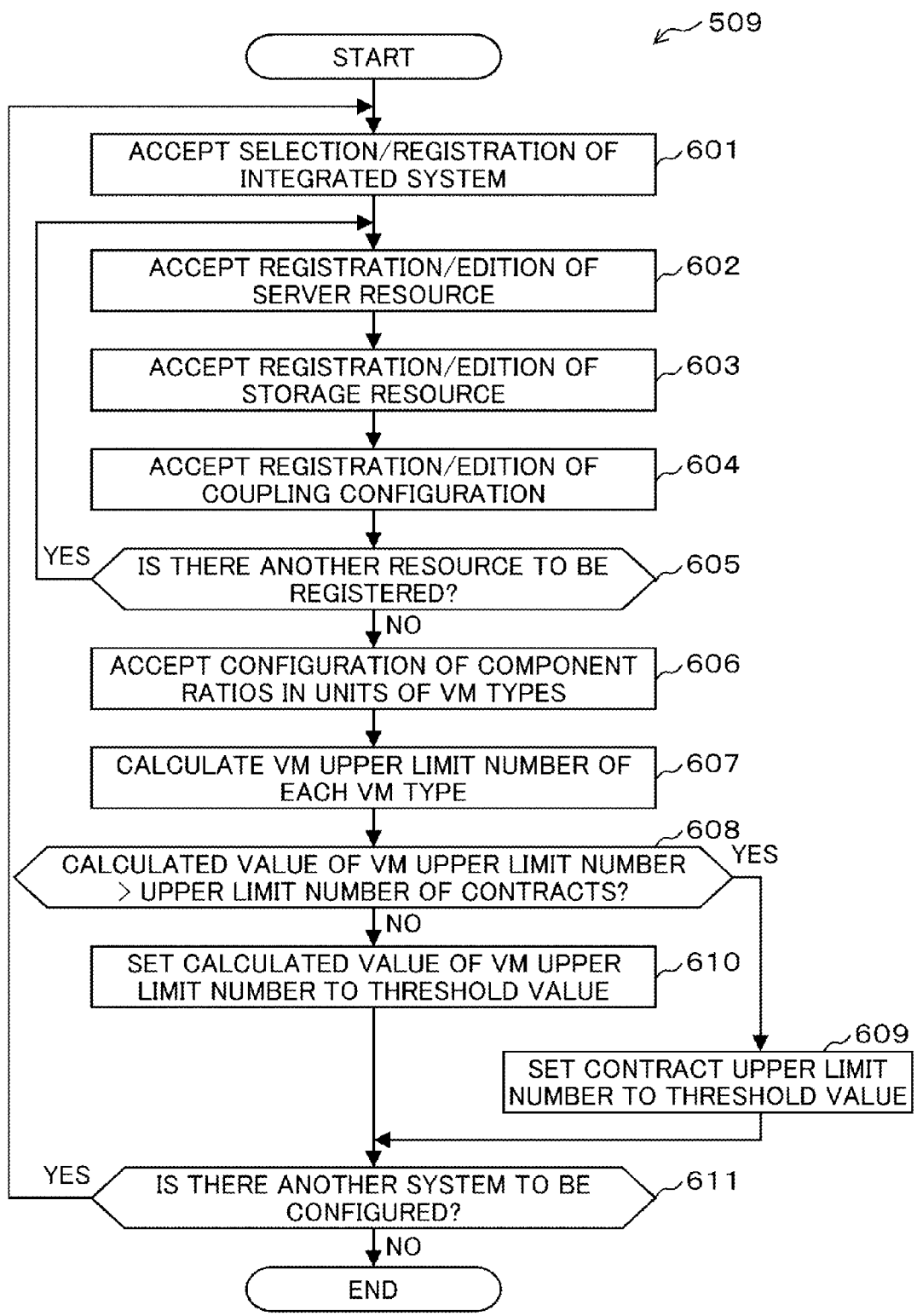
FIG. 6 is a diagram showing an example of a flow chart of an integrated system configuring program.

FIG. 6 is a diagram showing an example of a flow chart of an integrated system configuration program 509. As shown in FIG. 5, the CPU 501 reads the integrated system configuration program 509 from the memory 504 and executes the program as described below. In step 601, the CPU 501 accepts selection of one of the existing integrated systems 110 or registration of a new integrated system 110 from a user. For this purpose, in one management computer 119 of the plurality of management computers 119 shown in FIG. 1, the CPU 501 may accept the selection or the registration with an input from a keyboard or a mouse (not shown), or a user may operate the user terminal 101 to input data, and the CPU 501 may accept the data by reception by the LAN port 503 and the NIC 502 through the coupling apparatus 102. In place of the existing integrated systems 110, templates may be registered in advance and optionally used.

With respect to the integrated system 110 selected or newly registered in step 601, the CPU 501 accepts registration or edition of physical resources in steps 602 to 605. In step 602, the CPU 501 accepts registration or edition of the physical resources in the servers 112. In this case, the physical resources of the servers 112 are expressed as the specifications of each of the servers 112 and the number of servers 112 mounted on the integrated system 110. The specifications of each of the servers 112 include the machine name of the server 112, the number of CPUs 301, the capacity of the memory 302, the type (HDD or SSD) of the memory device 304, the memory capacities, and the number of memories 302, the types, the transfer speeds, and the number of ports of the FC HBA 305 or the NIC 307, and the like.

As in step 601, the pieces of information are input by using the user terminal 101 or the management computer 119 by a user. When a new server 112 is added to the existing integrated system 110 or a new integrated system 110 is added, the CPU 501 accepts the addition as new registration, and the memories 302 of the existing servers 112 are increased in number. When the capacities of the memories 302 are increased, the CPU 501 accepts the increase as edition.

In step 603, the CPU 501 accepts registration or edition of physical resources of the storages 117. The physical resources of the storages 117 are expressed as the specifications of each of the storage 117 and the number of storages 117 mounted on the integrated system 110. The specifications of the storage 117 include the machine name of the storage 117, configurations of independent storages (more specifically, the types and the number of memory devices, an available memory capacity, a RAID (Redundant Arrays of Inexpensive Disks) level, and a performance index), the types, the transfer speeds, and the number of ports 416, and the like. The pieces of information are input by using one of the user terminal 101 and the management computer 119 by a user as in steps 601 and 602.

Figure 7:
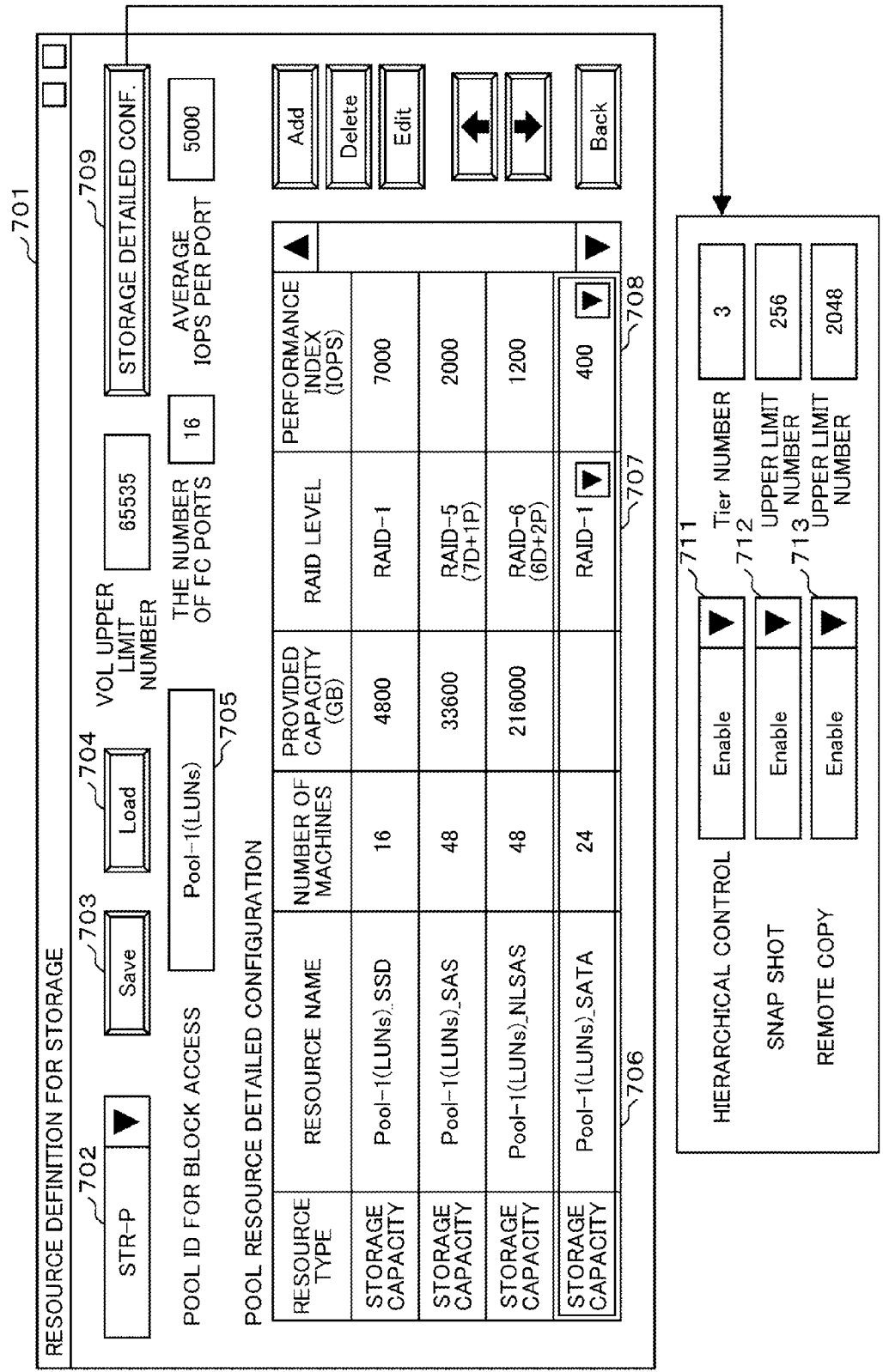
FIG. 7 is a diagram showing an example of a resource configuration screen.

An example of a resource configuration screen to be displayed to cause the CPU 501 to accept registration or edition of physical resources from a user in step 603 will be described below. FIG. 7 is a diagram showing an example of the resource configuration screen. Since registration or edition related to the storage 117 is performed in step 603, a window 701 for defining storage resources is displayed as the resource configuration screen. The storage resource defining window 701 inputs a storage model input 702. As the storage model, the machine name of the storage 117 may be expressed, or some other specification may be expressed. The storage model input 702 is a pull-down menu, and one of the storage model displayed with the pull-down menu may be made selectable.

A save button 703 and a load button 704 are to accept a designation of saving information input on the storage resource definition window 701 and making the information available later and a designation of loading saved information and making the information available, respectively. As a pool ID input 705, the ID of a storage pool in the storage 117 is input. According to the contents of the pool ID input 705, a target for pool resource detailed configuration is determined. The example shown in FIG. 7 shows a state in which a row 706 of "Pool-1(LUNs)_SATA" in the pool resource detailed configuration is being input. The row 706 shows a state in which the number of memory devices has been input as 24, an available capacity has not been input, a RAID level input 707 and a performance index 708 can be selected on the pull-down menu.

A storage function detailed configuration button 709 is to display a sub-window 710 and to input a further configuration. The sub-window 710 is to configure an optional function of the storage 117. In this example, the storage 117 has a hierarchical control function, a snap-shot function, and a remote copy function. Pieces of information related to these functions are configured. A hierarchical control input 711 is a pull-down menu to determine whether hierarchical control is made enable or disable, a snap-shot input 712 is a pull-down menu to determine whether a snap shot is made enable or disable, and a remote copy input 713 is a pull-down menu to determine whether remote copy is made enable or disable.

In step 604, the CPU 501 accepts registration or edition of physical resources of the coupling apparatuses 111. The physical resources of the coupling apparatus 111 are expressed as the specifications of each of the coupling apparatuses 111 and a configuration showing a specific one of the LAN ports 201 and a specific one of the FC ports 202 are used to couple the server 112 and the storage 117 to each other. The specifications of the coupling apparatus 111 includes the machine name of the coupling apparatus 111, the number of LAN ports 201, the number of FC ports 202, a transfer speed, the type of convertible protocol, and the like. The CPU 501 need not be execute step 604 and may execute the registration or edition of the physical resources of the coupling apparatus 111 in step 602 or step 603.

In step 605, the CPU 501 determines whether another physical resource to be registered or edited remains. When the CPU 501 determines that the physical resource remains, the CPU 501 returns to step 602. For example, when the physical resources of the two servers 112 are registered, the CPU 501 may accept the registration of the physical resource of the first server 112 in the first step 602, the CPU may determine in step 605 that registration of the physical resource of the second server 112 remains, and the CPU 501 may return to the second step 602 to accept the registration of the physical resources of the second server 112 in step 602. In this case, on the basis of an input by a user, the CPU 501 may determine that another physical resource to be registered remains.

In step 606, the CPU 501 accepts a configuration of component ratios of VM types, i.e., the computer VMs 113, the storage VMs 114, and the cloud cooperation VMs 115 in each of the integrated systems 110. As the configuration of the component ratios, values of ratios, i.e., a percentage of the computer VMs 113 is X %, a percentage of the storage VMs 114 is Y %, and a percentage of the cloud cooperation VMs 115 is Z % may be accepted. Component ratios of type A, type B, and type C which have been described with reference to FIG. 1 are determined in advance, and type A, type B, or type C may be accepted.

Furthermore, the CPU 501 writes the configuration of the accepted component ratios in an integrated system resource information table 505 in the memory 504 shown in FIG. 5. FIG. 8 is a diagram showing an example of the integrated system resource information table 505. The ID (Sys-ID) of the integrated system 110, the name of the integrated system 110, the model name of the storage 117, the model name of the server 112, and the number of servers 112 in the integrated system resource information table 505 are written by the CPU 501 in steps 601 to 604.

The types (Sys-Type) of the integrated systems 110 in the integrated system resource information table 505 are type A, type B, and type C, and express ratios of configurations of the computer VMs 113, the storage VMs 114, and the cloud cooperation VMs 115 as percentages. When the CPU 501 accepts the values of the ratios in step 606, the CPU 501 writes the accepted type, and writes the values of ratios predetermined for each of the types. When the CPU 501 accepts a type in step 606, the CPU 501 writes the accepted type and writes a value of a ratio predetermined depending on the type. When four or more types of VMs are used, the integrated resource information table 505 has a column depending on the types. When the values of the ratios are different from predetermined values, a custom may be written as the type (Sys-Type) of the integrated system 110.

The CPU 501 calculates an upper limit number of VMs for each of the types of the VMs in step 607. FIG. 10 is a diagram showing an example of a VM upper limit number table 506. The ID (Sys-ID) of the integrated system 110, the types of the servers 112, and the number of servers in the VM upper limit number table 506 are written by the CPU 501 in steps 601 and 602. The types of the servers 112 are, for example, a standard type and a high-performance type. Each of the standard servers 112 can simultaneously execute up to 20 VMs, and each of the high-performance servers 112 can simultaneously execute up to 40 VMs, and the servers 112 of these types have the different numbers of VMs that can be simultaneously executed, respectively.

In this example, all the servers 112 are of the standard type, and each of the servers 112 can simultaneously execute up to 20 VMs. For this reason, with respect to the integrated system 110 having A01 as its ID (Sys-ID), the CPU 501 multiplies the number of servers, i.e., 20 by the number of VMs that can be simultaneously executed, i.e., 20 to calculate 400 as the VM upper limit number of the integrated system 110, the calculated value of 400 is multiplied by 40% of the computer VMs, 40% of the storage VMs, and 20% of the cloud cooperation VMs in the integrated system resource information table 505 to calculate a value of 160, a value of 160, and a value of 80, respectively, and the resultant values are written in the VM upper limit number table 506. With respect to another integrated system 110, the CPU 501 calculates a computer VM upper limit, a storage VM upper limit, and a cloud cooperation VM upper limit according to the same calculation formula and writes the upper limits in the VM upper limit number table 506. When one of the integrated systems 110 has the servers 112 of a plurality of types, the CPU 501 may calculate an upper limit of each of the types, sum up the upper limits, and write the sum total in the VM upper limit number table 506.

In the computer system 100 or the like, an upper limit number of licenses of software, an upper limit number of cloud service, and the like are contracted in many cases. For example, when the licenses of an OS installed in the computer VM 113 have an upper limit number, the upper limit number of the licenses is the upper limit number of the computer VM 113. Thus, the CPU 501, in step 608, determines whether the VM upper limit number calculated in step 607 exceeds the contracted upper limit number. When the calculated VM upper limit number exceeds the contracted upper limit number, the CPU 501 sets the contracted upper limit number as a threshold value in step 609. When the calculated VM upper limit number does not exceed the contracted upper limit number, the CPU 501 sets the calculated VM upper limit number as a threshold value in step 610. In this case, the threshold value will be described later with reference to FIG. 9.

In step 611, the CPU 501 determines whether another integrated system 611 to be configured remains. The CPU 501 returns to step 601 when the integrated system 611 remains, and ends the processes of the integrated system configuration program 509 when the integrated system 611 does not remain. When the integrated system configuration program 509 is executed in one of the plurality of management computers 119 shown in FIG. 1, when the integrated system 110 except for the integrated system 110 including the management computer 119 that executes the program is to be configured, the integrated system configuration program 509 may be executed in cooperation with the management computer 119 included in the integrated system 110 to be configured.

Figure 9:
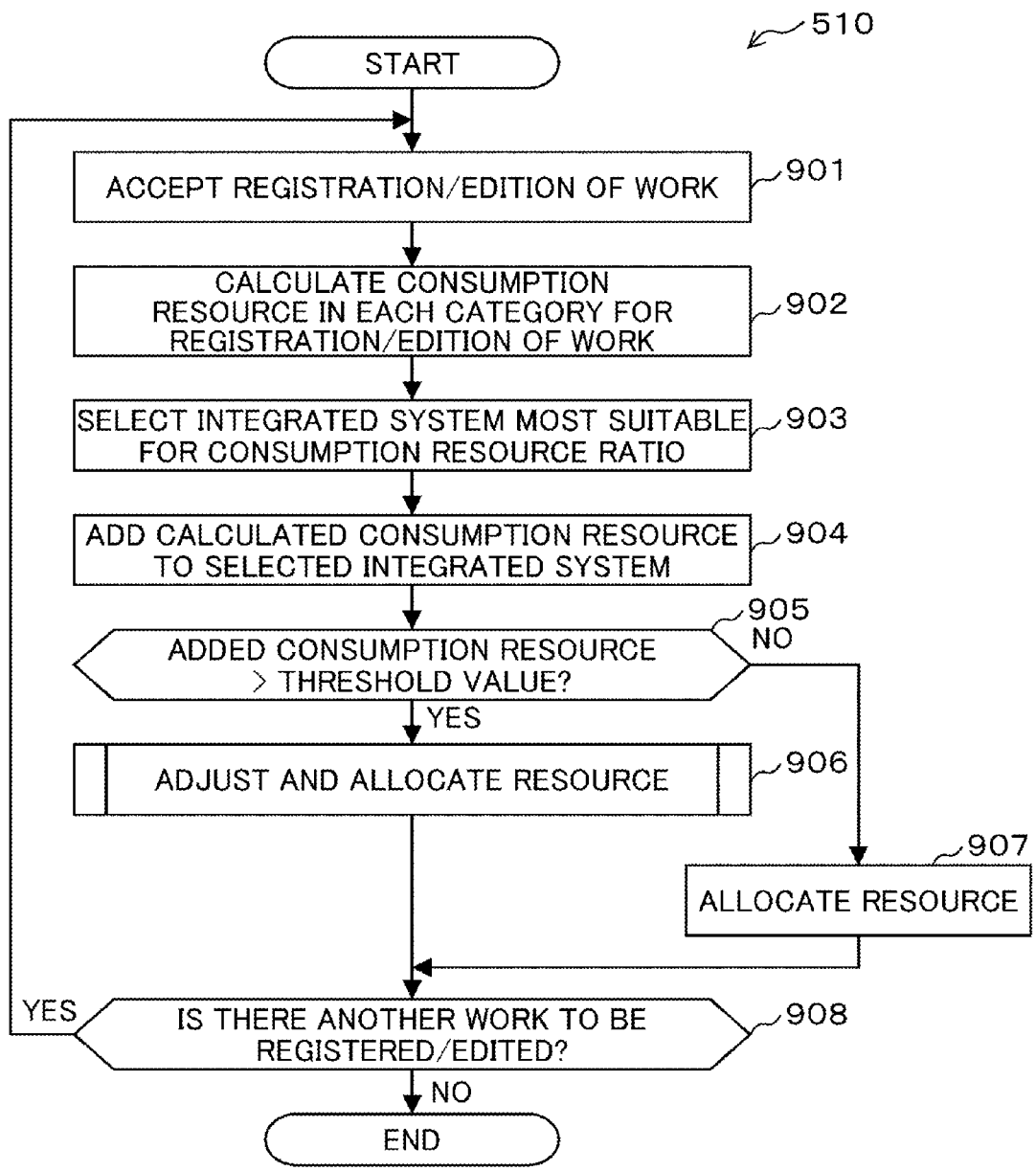
FIG. 9 is a diagram showing an example of a work registration program flow chart for an integrated system.

FIG. 9 is a diagram showing an example of a flow chart of a work registration program 510 for integrated system. The work registration program 510 for integrated system is a process of allocating the computer VM 113, the storage VM 114, and the cloud cooperation VM 115 to a work on the basis information configured by the integrated system configuration program 509 when the work is actually executed. In step 901, the CPU 501 accepts a work to be registered or edited. In step 902, the CPU 501 calculates consumption resources in units of categories of the work to be registered or edited in step 901. In this case, the category represents a computer or a storage.

FIG. 11 is a diagram showing an example of a work resource information table 507. The work resource information table 507 includes the names of works executed in the computer system 100 and a flag representing whether a work can be migrated from the integrated system 110 to the cloud service 104. The contents of a cloud migratable flag may include pieces of information such as N which means non-migratable, Y which means migratable, COM which means that only the computer 113 is migratable, STR which means that only the storage VM 114 is migratable, and ALL that means that all the VMs are migratable.

The work resource information table 507 includes the number of computer VMs 113 and the number of storage VMs 114 that are required to execute a work. For example, when the two high-performance computer VMs 113 and the 20 standard computer VMs 113 are required to execute a work having work name J, each of the high-performance computer VMs 113 requires physical resources of the three standard computer VMs 113. For this reason, physical resources of a total of 26 standard computer VMs are required. Similarly, when one high-performance storage VM 114 is required to execute the work having work name J, the high-performance storage VM 114 requires the same physical storages as those of the standard storage VM 114 for each virtual VOL, i.e., requires the standard storage VMs 114, the number of which is the number of virtual VOLs. For this reason, five standard storage VMs are required. In this manner, the CPU 501 calculates the required computer VMs 113 and the required storage VMs 114 as consumption resources. Since a virtual VOL capacity and the number of virtual VOLs are in proportion to the number of virtual VOLs and the number of storage VMs, respectively, the number of storage VMs may represents the virtual VOL capacity.

In step 903, the CPU 501 selects the integrated system 110 most suitable for each work on the basis of the calculated consumption resource. In the example in FIG. 11, 26 that is the number of computer VMs 113 and 5 that is the number of storage VMs 114 required to execute the work having work name J are 84% and 16%, respectively. For this reason, type C in which the ratio of the computer VMs 113 is higher than that of the storage VMs 114 is selected by the CPU 501. Since the ratios of the computer VMs 113 and the storage VMs 114 required to execute a work having work name K are 50% and 50%, respectively, the CPU 501 selects type A.

In step 904, the CPU 501 adds the consumption resources calculated in step 902 to the resources which have been consumed in the integrated system 110 selected in step 903. FIG. 12 is a diagram showing an example of a computer•storage•cloud VM number table 508. For each of the integrated systems of the integrated system resource information table 505 described with reference to FIG. 8, in the computer•storage•cloud VM number table 508, the numbers of computer VMs 113, storage VMs 114, and cloud cooperation VMs 115 are stored. As threshold values, the values set in step 609 or step 610 in FIG. 6 are used, and the values of the VM upper limit number table 506 described with reference to FIG. 10 are used. The consumption number is the number of VMs which have been used. The example in FIG. 12 shows a state the 26 computer VMs 113 and the 5 storage VMs 114 required to execute the work having work name J are added in a state in which the consumption numbers of the computer VMs 113 and the storage VMs 114 are 0 in type C. When type C is selected, the CPU 501 adds the number of computer VMs 113 to be newly consumed to a value of 26 that is the number of consumed computer VMs 113. With respect to the other VMs, the same addition as described above is performed.

The CPU 501 determines in step 905 whether the number of consumption resources after the addition exceeds a threshold value. In the example in FIG. 12, the value of 26 that is the number of consumed computer VMs 113 does not exceed a threshold value of 160 and the value of 5 that is the number of consumed storage VMs 114 does not exceed a threshold value of 10. When the CPU 501 determines that the number of consumption resources does not exceed the threshold value, resources are allocated in step 907. More specifically, the VMs are used to execute the work having work name J. When the number of consumption resources exceeds the threshold value, the CPU 501 adjusts the resources which have been used in step 906 to allocate the resources. The processing contents in step 906 will be described below with reference to FIG. 13.

In step 908, the CPU 501 determines whether there is another work to be registered or edited. When there is another work to be registered or edited, the CPU 501 returns to step 901. When there is no another work to be registered or edited, the CPU 501 ends the processes of the work registration program 510 for the integrated system.

Figure 13:
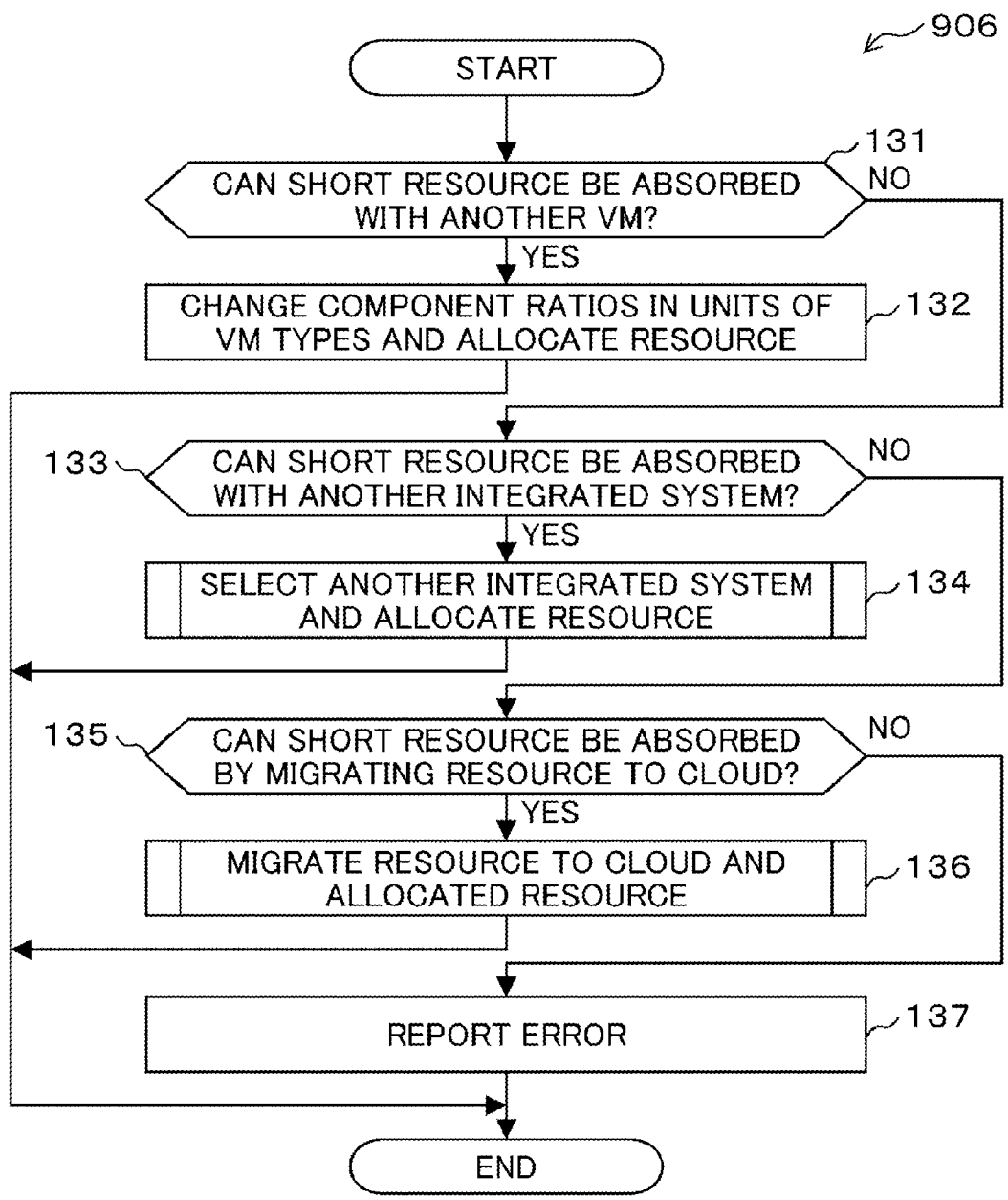
FIG. 13 is a diagram showing an example of a flow chart of a resource adjustment•allocation program.

FIG. 13 is a diagram showing an example of a flow chart of a program of adjusting•allocating resources. The CPU 501 executes the flow chart shown in FIG. 13 as execution of the step 906. In step 131, the CPU 501 determines whether short resources can be covered by using other VMs in the same integrated system 110. For example, in one integrated system 110, when a total sum of the number of consumed computer VMs 113 is 165 and a threshold value is 160, a value of 5 is short. However, if there are five spare storage VMs 114, the CPU 501 determines that the shortage can be covered by using the storage VMs 114 as the computer VMs 113. In step 132, the CPU 501 changes component ratios of each of the VM types to cover the shortage with a spare and allocates the resources. A value obtained by subtracting the consumption number from the threshold value in the computer•storage•cloud VM number table 508 is the spare.

In contrast to this, when VMs of all the types are short, or even though VMs of some VM type are short, when there is no spare which is enough to cover shortage of another VM type, in step 133, the CPU 501 determines whether the shortage can be absorbed by another integrated system 110. When the CPU 501 determines that the shortage can be absorbed, in step 134, the CPU 501 selects another integrated system 110 to allocate resources. Steps 133 and 134 will be described later with reference to FIG. 14.

When the CPU 501 determines that the shortage cannot be absorbed in another integrated system 110, the CPU 501 determines whether the shortage can be absorbed by migrating resources to the cloud service 104 in step 135. When the CPU 501 determines that the shortage can be absorbed, the CPU 501 migrates the resources to the cloud service 104 in step 136 to allocate the resources. Step 136 will be further described later with reference to FIG. 15. When the CPU 501 determines that the shortage cannot be absorbed by migration to the cloud service 104, the CPU 501 reports an error in step 137.

Figure 14:
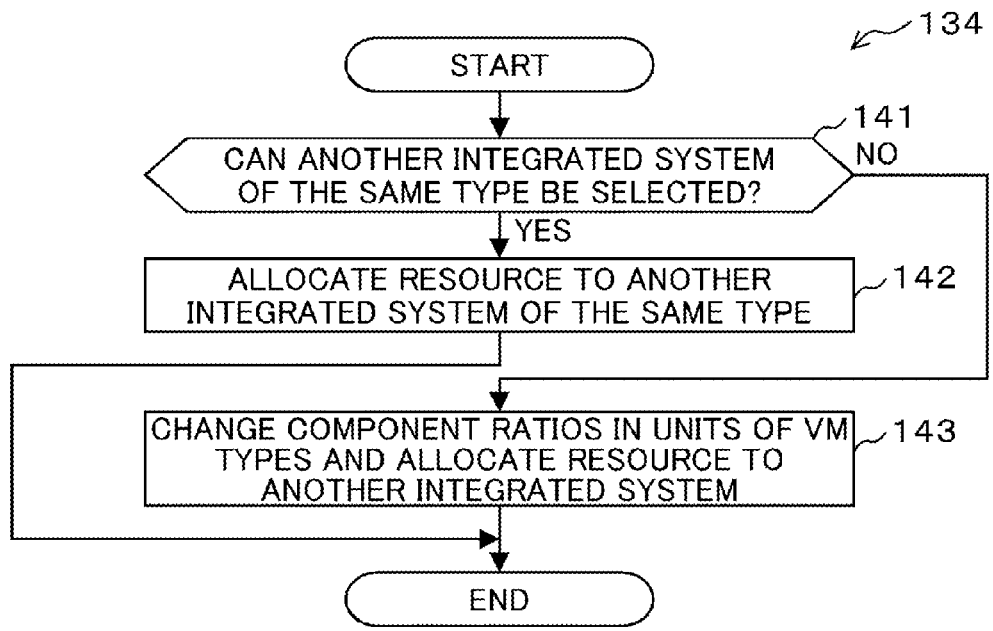
FIG. 14 is a diagram showing an example of a flow chart of a program that allocates resources to another integrated system.

FIG. 14 is a diagram showing an example of a flow chart of a program of selecting another integrated system 110 to allocate resources. The CPU 501 executes the flow chart shown in FIG. 14 as execution of step 134. In step 141, the CPU 501 determines whether another integrated system 110 of the same type can be selected. The other integrated system 110 of the same type is an integrated system which is other than the integrated system 110 selected in step 903 and is of the same type as that of the selected integrated system 110.

The determination whether another integrated system 110 is performed such that spares of the integrated systems 110 are calculated with reference to the computer•storage•cloud VM number table 508. When the CPU 501 determines that another integrated system can be selected, the CPU 501 allocates resources to the integrated system 110 determined to be selectable in step 142. When the CPU 501 determines that another integrated system cannot be selected, the CPU 501 changes component ratios of VM types of another integrated system 110 of a different type to cover the shortage with a spare and allocates the resources in step 143.

The resources allocated to another integrated system 110 may be resources of a work accepted in step 901, i.e., VMs. The resources allocated to another integrated system 110 may be resources of a work which is not the work accepted in step 901 and to which resources have been allocated in the integrated system 110 selected in step 903. In this case, the work to which the resources have been allocated is migrated to another integrated system 110, the resources of the integrated system 110 selected in step 903 are released, and the released resources are increments to serve as spares.

Depending on works in which resources are migrated, the CPU 501 determines resources, i.e., the number of VMs absorbed in step 133. When the resources of the work accepted in step 901 are allocated to another integrated system 110, the CPU 501 determines the number of resources accepted in step 901 as the number of resources to be absorbed. When the resources of a work except for the work accepted in step 901 are allocated to another integrated system 110, the number of allocated resources of the work is determined as the number of resources to be absorbed.

Figure 15:
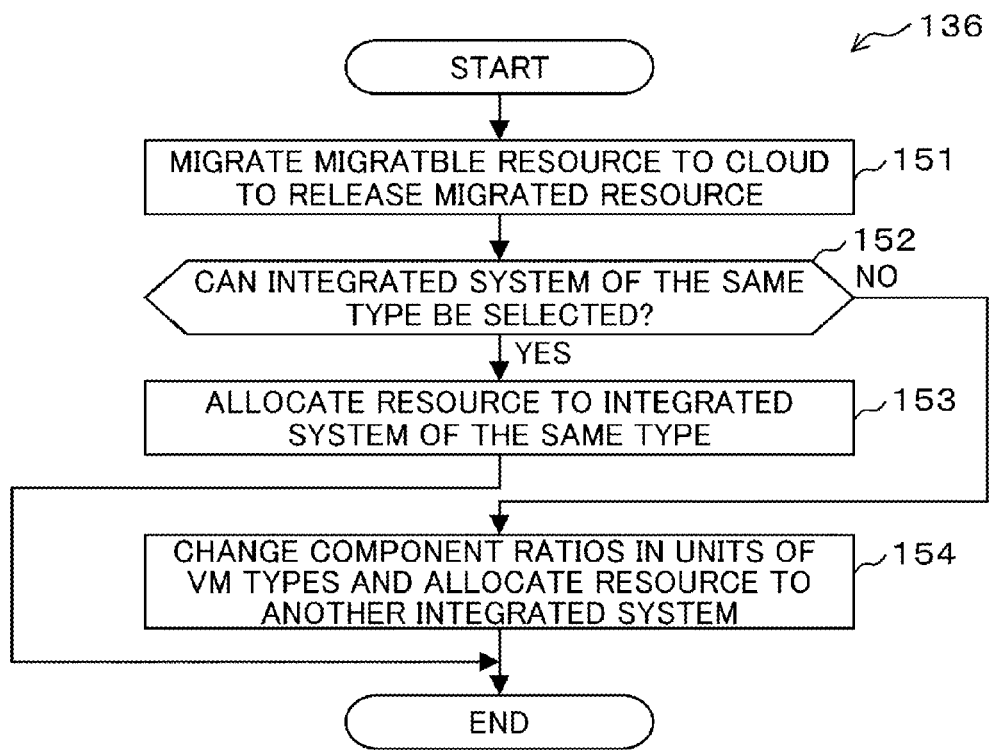
FIG. 15 is a diagram showing an example of a flow chart of a program that migrates resources to a cloud and allocates the resources.

FIG. 15 is a diagram showing an example of a flow chart of a program of migrating resources to the cloud service 104 to allocate the resources. In step 151, the CPU 501 migrates migratable resources to the cloud service 104 to release the migrated resources. More specifically, a cloud migratable flag of the work resource information table 507 migrates work Y to the could service 104 and removes the VMs used in the migrated work from the target of the consumption number of the computer•storage•cloud VM number table 508. In this case, the target of the work migrated to the cloud service 104 may be a work executed in the integrated system 110 selected in step 903 or may be a work executed in the integrated system 110 except for the integrated system 110 selected in step 903.

In steps 152 to 154, the CPU 501 performs the same processes as those in steps 141 to 143 described with reference to FIG. 14. When a work migrated to the could service 104 is a work executed in the integrated system 110 selected in step 903, the integrated system 110 serving as a source is the same as the integrated system 110 to which the resources are allocated. In step 152, the CPU 501 determines that the integrated system 110 of the same type can be selected.

As described above, an integrated system suitable for a work can be configured by a combination of VMs of different types, and a computer system obtained by combining a plurality of integrated systems suitable for a plurality of works can be configured. In new registration, edition, and the like of a work, the work can be allocated to a suitable integrated system, and the resources of the computer system can be efficiently utilized.

EXAMPLE 2

In the above description, in steps 901 to 903 in FIG. 9, the CPU 501 accepts registration or edition of a work, calculates consumption resources, and the integrated system 110 is selected. However, in the registration or edition of the work, the type of the integrated system 110 may be directly selected by a user. Types A to C are not selected, and the integrated system 110 may by selected depending on work uses. For example, type A is associated with a mail, Web browsing, and documentation creation serving as work uses. When a user selects the mail, the CPU 501 may select type A in accordance with the selected mail and select the integrated system 110 of type A.

Figure 16:
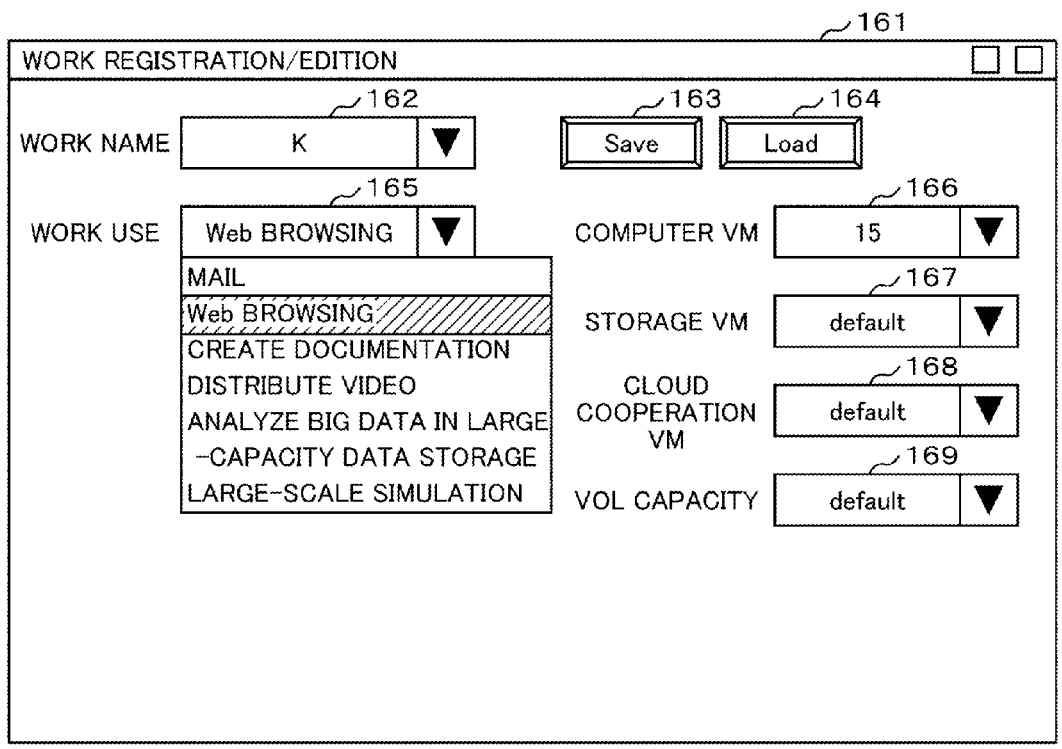
FIG. 16 is a diagram showing an example of a screen for registration or edition of a work.

FIG. 16 is a diagram showing an example of a screen of registration or edition of a work in the example 2. The CPU 501 displays a window 161 of registration and edition of a work in place of step 901. As an input 162 of a work name, a new work name may be input with a character string, or a registered work name may be selected on a pull-down menu. When the registered work name is input, a load button 164 is depressed to display a type/use or the like input in saving as inputs and to make the inputs editable. When a save button 163 is depressed, pieces of information of inputs 165 to 169 are saved in association with the work name of the input 162.

The work use input 165 is a pull-down menu to select a use of work. In this case, when a user selects Web browsing, type A is consequently selected. More specifically, as shown in FIG. 8, for example, ratios of the computer VMs 113, the storage VMs 114, and the cloud cooperation VMs 115 are 40%, 40%, and 20%, respectively. The input 166 of the computer VMs 113, the input 167 of the storage VMs 114, and the input 168 of the cloud cooperation VMs 115 are a pull-down menu to input the numbers of VMs, and the number of VMs and a default are input or selected. The defaults of the inputs 166 to 168 are designations of automatically inputting the numbers of VMs. For example, when a value of 15 is input as the input 166 of the computer VMs 113, the ratio of VMs is 40% that is equal to that of the computer VMs 13. For this reason, the number of storage VMs 114 is calculated as 15.

The VOL capacity input 169, a capacity value and a default is input or selected. For example, a user may input 600 GB as the VOL capacity input 169 as shown in FIG. 11. When a default is input as the VOL capacity input 169, one of the storage VMs 114 is in charge of one of virtual VOLs, and one of the virtual VOLs is defined as 40 GB of the virtual VOL capacity in advance. Since the number of storage VMs 114 is 15, the value of 15 may be multiplied by 40 GB to obtain 600 GB.

The CPU 501, in place of step 902, writes the pieces of information input on the window 161 for registration or edition of a work in the work resource information table 507.

As described above, when a use of work is input, an appropriate VM configuration is configured. With the simple operations, an integrated system suitable for a work can be selected.

REFERENCE SIGNS LIST

100 . . . computer system,
110 . . . integrated system,
112 . . . server,
113 . . . computer VM,
114 . . . storage VM,
115 . . . cloud cooperation VM,
117 . . . storage

The invention claimed is:

1. A computer system including a plurality of integrated systems of servers and storage apparatuses and including a management computer, comprising:
    each of the plurality of integrated systems including a plurality of resources the ratios of which are different from each other, and
    the management computer, depending on ratios of a plurality of resources required for a work, selecting an integrated system in which the work is executed from the plurality of integrated systems,
    wherein the integrated system includes a computer VM (Virtual Machine) as a first resource and includes a storage VM as a second resource, and
    wherein:
    the integrated system has physical resources, and
    the management computer, depending on the physical resources and ratio of the computer VMs and the storage VMs, calculates upper limit numbers of the computer VMs and the storage VMs, respectively, and sets smaller numbers of contracted upper limit numbers and the calculated upper limit numbers as a threshold value of the computer VMs and a threshold value of the storage VMs.

2. The computer system according to claim 1, wherein the management computer is included in the plurality of integrated systems.

3. The computer system according to claim 1, wherein the management computer selects an integrated system in which ratio of the plurality of resources of the integrated system are at a ratio of the plurality of resources required for the work.

4. The computer system according to claim 1, wherein the storage VM is a VM operating as a storage controller, and includes virtualization of a storage and addition of a cache.

5. The computer system according to claim 1, wherein, when the total number of computer VMs required for all works in one integrated system exceeds the threshold value of the computer VMs, the management computer changes the storage VMs into the computer VMs.

6. The computer system according to claim 1, wherein, when the total number of storage VMs required for all works in one integrated system exceeds the threshold value of the storage VMs, the management computer changes the computer VMs into the storage VMs.

7. The computer system according to claim 1, wherein, when the total number of computer VMs required for all works exceeds the threshold value of the computer VMs and when the total number of storage VMs required for all works exceeds the threshold value of the storage VMs in a first integrated system, the management computer migrates the works executed in the first integrated system to a second integrated system.

8. The computer system according to claim 1, further comprising:
    a cloud service,
    wherein, when the total number of computer VMs required for all works exceeds the threshold value of the computer VMs and when the total number of storage VMs required for all works exceeds the threshold value of the storage VMs in one integrated system, the management computer migrates the works executed in the integrated system to a cloud service.

9. A management computer controlling method in a computer system including a plurality of integrated systems of servers and storage apparatuses, comprising:
    a configuring step of being configured a plurality of resources having different ratios to the plurality of integrated systems, respectively;
    a selecting step of selecting, depending on the ratios of the plurality of resources required for a work, an integrated system in which the work is executed from the plurality of integrated systems,
    a registering step of registering physical resources of the integrated systems; and
    a determining step of, depending on the physical resources and ratios of the computer VMs (Virtual Machines) and the storage VMs, calculating upper limit numbers of the computer VMs and the storage VMs and determining smaller numbers of contracted upper limit numbers and calculated upper limit numbers as a threshold value of the computer VMs and a threshold value of the storage VMs, respectively,
    wherein, in the configuring step, a computer VM is configured as a first resource, and a storage VM is configured as a second resource.

10. A management computer controlling method according to claim 9, wherein the selecting step selects an integrated system in which ratio of the plurality of resources of the integrated systems are at a ratio of the plurality of resources required for the work.

11. The management computer controlling method according to claim 9, wherein, in the configuring step, the storage VM that is a VM operating as a storage controller and includes virtualization of a storage and addition of a cache is configured.

* * * * *